(12) United States Patent
Sadasivan

(10) Patent No.: US 8,893,260 B2
(45) Date of Patent: Nov. 18, 2014

(54) SECURE REMOTE ACCESS PUBLIC COMMUNICATION ENVIRONMENT

(75) Inventor: Biju Sadasivan, Kottarakkara (IN)

(73) Assignee: Rockstar Consortium US LP, Plano, TX (US)

( * ) Notice: Subject to any disclaimer, the term of this patent is extended or adjusted under 35 U.S.C. 154(b) by 788 days.

(21) Appl. No.: 12/638,556

(22) Filed: Dec. 15, 2009

(65) Prior Publication Data

US 2010/0161960 A1    Jun. 24, 2010

(30) Foreign Application Priority Data

Dec. 17, 2008 (IN) .......................... 3174/CHE/2008

(51) Int. Cl.
*H04L 29/06* (2006.01)

(52) U.S. Cl.
USPC .......................................................... 726/15

(58) Field of Classification Search
USPC ..................................... 726/15; 713/150–154
See application file for complete search history.

(56) References Cited

U.S. PATENT DOCUMENTS

| | | | |
|---|---|---|---|
| 6,381,631 B1 | 4/2002 | van Hoff | |
| 6,678,734 B1 | 1/2004 | Haatainen | |
| 6,926,199 B2 | 8/2005 | Jay et al. | |
| 7,216,173 B2 | 5/2007 | Clayton | |
| 7,568,047 B1 * | 7/2009 | Aysan et al. .................. | 709/238 |
| 2003/0131245 A1 | 7/2003 | Linderman | |
| 2003/0172264 A1 * | 9/2003 | Dillon ........................... | 713/160 |
| 2004/0044792 A1 * | 3/2004 | Sjollema et al. .............. | 709/246 |
| 2004/0268148 A1 | 12/2004 | Karjala et al. | |
| 2005/0044350 A1 | 2/2005 | White et al. | |
| 2005/0195780 A1 * | 9/2005 | Haverinen et al. ............ | 370/338 |
| 2006/0005240 A1 | 1/2006 | Sundarrajan et al. | |
| 2006/0034290 A1 | 2/2006 | Kalofonos et al. | |
| 2006/0168149 A1 | 7/2006 | Dispensa | |
| 2007/0150946 A1 | 6/2007 | Hanberger et al. | |
| 2007/0239886 A1 * | 10/2007 | Montemayor et al. ........ | 709/232 |
| 2008/0034198 A1 * | 2/2008 | He et al. ........................ | 713/151 |
| 2008/0046993 A1 | 2/2008 | Mullick et al. | |
| 2009/0031028 A1 * | 1/2009 | Kumar et al. ................. | 709/227 |

OTHER PUBLICATIONS

International Search Report and Written Opinion of the International Searching Authority from corresponding PCT application PCT/CA2009/001834.
European Search Report from related EP application 09832772.9 dated Dec. 12, 2012.

* cited by examiner

*Primary Examiner* — David Le
(74) *Attorney, Agent, or Firm* — Anderson Gorecki & Rouille LLP

(57) ABSTRACT

A method and system provide a user device with secure access to an enterprise application in an enterprise network through VPN. The enterprise application is accessed from a user device such that it sends and receives data packets through the VPN client. For this, a request to send packets, originating from the user application, is intercepted by a VPN agent associated with the user application. In turn, the VPN agent associates an address of a loop-back interface with the user application. Thereafter, packets sent by the user application, are re-directed to the VPN client through the loop-back interface. Similarly, packets received by the VPN client from the enterprise network are routed through the loop-back interface to the user application.

21 Claims, 7 Drawing Sheets

SECURE REMOTE ACCESS PUBLIC COMMUNICATION ENVIRONMENT

TECHNICAL FIELD

The invention generally relates to accessing a remote application in a secure network through a virtual private network (VPN) and particularly relates to data transfer by the remote application.

BACKGROUND OF THE INVENTION

A network is a system of hardware and software, put together for the purpose of communication and resource sharing. A network includes resources such as transmission hardware and devices to interconnect transmission media and to control transmissions, and software to decode and format data, as well as to detect and correct problems in transmission. There are several types of networks in use today. In some networks, such as local area networks (LAN) and wide area networks (WAN), the resources are physically connected to each other. In other networks, such as virtual private networks (VPN), some of the links between the resources are carried by virtual connections routed through a larger network.

A VPN typically uses a public communication infrastructure, such as the Internet, to provide remote offices or individual users with secure access to an enterprise network. A VPN works by using the shared public infrastructure while maintaining privacy through security procedures and tunneling protocols such as Layer Two Tunneling Protocol (L2TP), Secure Socket Layer (SSL) protocol, and Internet Protocol security (IPSec) protocol.

Traditional VPN systems required dedicated software, referred to as client software, to be installed and managed on user computing devices to establish modules in the computing device that enable connection to the VPN and the use of remote applications. As maintaining software on user computing devices became relatively costly and time consuming, clientless VPN systems were developed. These clientless VPN systems do not require a device to be pre-configured with the client software. Such clientless VPN systems, however, are limited by their applicability to static port remote applications alone. With a growing demand for dynamic port applications, such as Voice over Internet Protocol (VoIP) and Video Conferencing, it would be advantageous to implement a way of providing clientless VPN access that can support the dynamic port applications as well.

SUMMARY OF THE INVENTION

Methods and systems of providing a user device with secure access to an enterprise network through a VPN are described. The user device may include a VPN client and a user application. An agent in the user device can intercept a request to an operating system service for establishing a connection that originates from the user application and, a communication channel can be established between the agent and the VPN client application based upon the intercepted request. Thereafter, packets sent by the user application, may be re-directed to the VPN client through the loop-back interface. The VPN client can establish a VPN tunnel with the enterprise network and forward data packets to the enterprise network. Similarly, packets received by the VPN client from the enterprise network are routed to the remote application through the loop-back interface. In one embodiment of the invention, the user application and VPN client may be dynamically downloaded onto the user device. The VPN client can execute the user application on the user device and associate an agent with it.

Those skilled in the art will appreciate the scope of the present invention and realize additional aspects thereof after reading the following detailed description of the preferred embodiments in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

The present invention provides a method and apparatus for providing remote access over a virtual private network (VPN). The method and apparatus enable users to access resources within an enterprise network, using a user computing device, connected through public network such as Internet, even without having administrative privileges for the user computing device.

Figure 1:
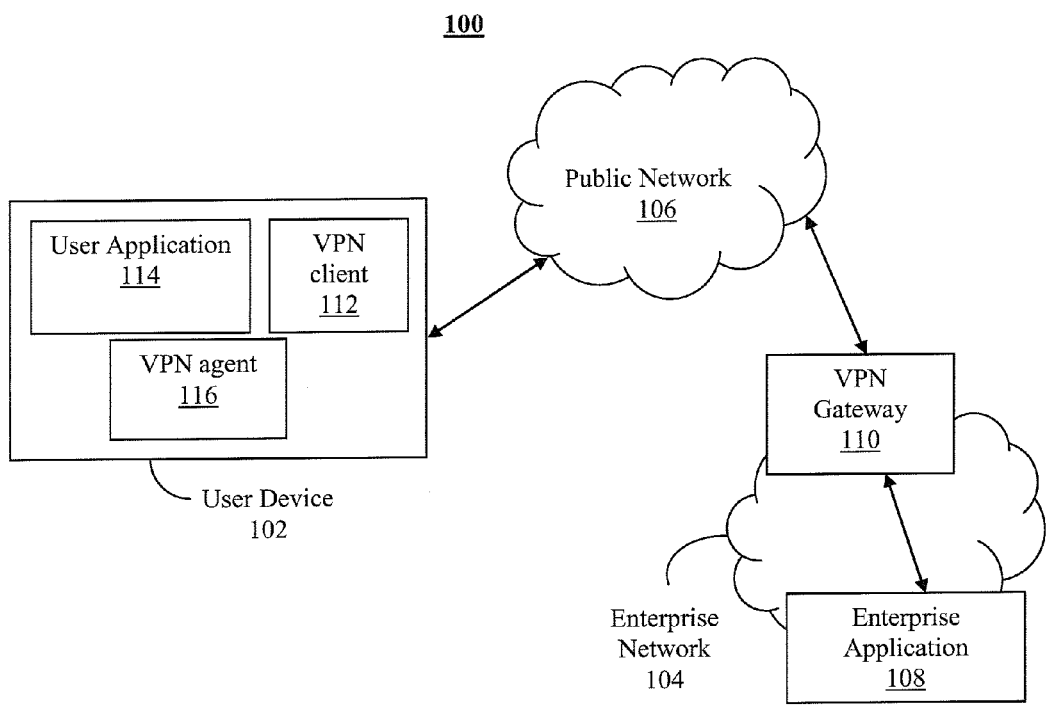
FIG. 1 is a functional block representation of an example of a network in which remote users are able to obtain remote access through a VPN according to one embodiment of the present invention.

FIG. 1 shows an example user device 102 that communicates with an enterprise network 104 via a public network 106. The user device 102 may include various types of computing devices, such as a laptop, a personal digital assistant (PDA), and a personal computer. The user device 102 may include a publicly accessible device, such as a device in an Internet booth, a kiosk, and the like.

The enterprise network 104 and the public network 106 may be wireless or wired networks or a combination of the two. The enterprise network 104 includes network elements such as routers or switches connected together to enable data to be transmitted within the enterprise network 104. The enterprise network 104 may have many components, such as e-mail servers, hosts, resources, and other common network elements which are not shown in this example. The invention is not limited to use with an enterprise network configured in any particular manner and, accordingly, details of the internal structure of the enterprise network 104 have been omitted to avoid obfuscation of the invention.

In a preferred embodiment, the enterprise network 104 includes an enterprise application 108 and a VPN gateway 110. VPN gateways are well known and the invention is not limited to a particular embodiment in which particular types of external resources are used. The VPN gateway 110 enables a user to use the user device 102 to obtain remote access to the enterprise network 104 across the public network 106 in a secure way, for example by creation of a VPN tunnel between the user device 102 and the enterprise network 104. The enterprise application 108 may be included on a single server or a variety of servers, which may be a server farm or part of a server farm. Various types of servers are well known and the invention is not limited to a particular embodiment in which particular types of servers are used.

Traditionally, when a user wanted to obtain remote access to an enterprise network, the remote user would need to install a VPN client on a user computer that was to be used to access the enterprise network. The installed VPN client would enable the remote computer to connect to the enterprise network through a VPN tunnel. VPN clients available today need kernel level components to be installed in the device which requires higher-level user privilege (e.g., administrative user privilege). Since the VPN client was specifically installed on a particular computer, if the user wanted to obtain access from a different computer, the user would need to install the VPN client on that computer. For example, if a user wanted to log into the enterprise network 104 from home, the user would need to install the VPN client on their home computer, and then use the VPN client to access the enterprise network 104. If the user was traveling without a computer in which the VPN client had been installed, VPN access was often not feasible since administrative user privilege of the publicly available device would not generally be granted.

To overcome these limitations, according to an embodiment of the invention, VPN tunnels may be established using dynamically downloadable VPN clients, such as a VPN client 112 shown in FIG. 1. The VPN client 112 may be downloaded from, for example, a web portal, or an external memory device such as a USB drive. In a preferred embodiment, the user is authenticated by the web portal or the memory device before the VPN client 112 is downloaded onto the user device 102.

By causing the VPN client to be dynamically downloaded during a session, the user device 102 does not need to be pre-loaded with a VPN client. Thus, any computer with an Internet browser may be used to log into the enterprise network 104. The dynamically downloaded components may be deleted upon termination of the session so that the availability of the components of the VPN client 112 may be terminated once the session has ended. Accordingly, a user will be able to access a corporate network even from a publicly available computer.

In one embodiment, the VPN client 112 may be downloaded along with user application 114 that is to be remotely executed through a web interface. In operation, the user, on authentication, can be provided with a list of applications that can be made available to the user. On selection of a user application, both the user application 114 and the VPN client 112 can be dynamically downloaded onto the user device 102. The VPN client 112 may execute the user application 114 and associate a VPN agent 116 with the user application 114 in order to intercept requests for establishing a connection, such as a socket calls, originating from the user application 114.

Further, the VPN agent 116 can establish a communication channel with the VPN client 112 to redirect packets, such as data packets, originating from the remote application 114. The VPN client 112 also establishes a logical tunnel or VPN tunnel with the VPN gateway 110 to encrypt and forward the packets. The various aspects of embodiments of the user device 102 will be explained in detail with reference to FIGS. 2-4.

Figure 2:
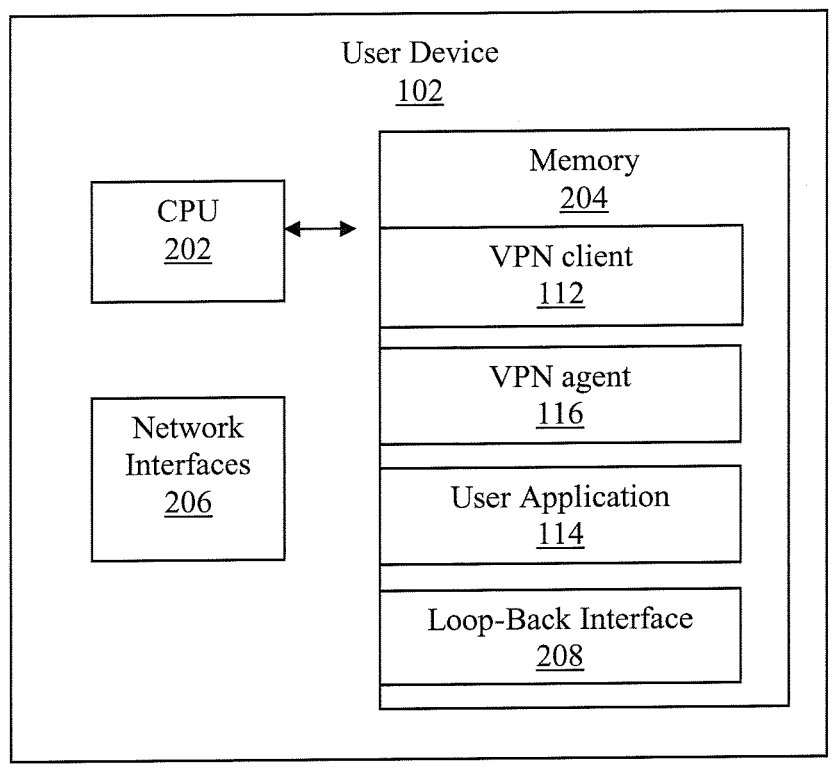
FIG. 2 represents an example of a user computing device according to one embodiment of the present invention.

FIG. 2 represents an example of a user device 102. For ease of explanation, the embodiment shown in FIG. 2 is shown in the state where the VPN client 112 has been dynamically downloaded so that the user device 102 is ready to communicate using a tunnel on the public network 106. As discussed above, once the session is completed, some or all of the VPN components may be removed from the computer to return the user device 102 to a normal configuration.

In a preferred embodiment, the user device 102 includes a central processing unit (CPU) 202, a memory 204 and network interfaces 206. The CPU 202 implements control logic for processing modules stored in the memory 204. The memory 204 can include volatile and non-volatile memory. The user device 102 interacts with the public network 106 and the enterprise network 104 via the network interfaces 206. The network interfaces 206 include, for example, a physical adapter containing ports configured to connect to physical links on the public network 106 and to VPN networks established through the VPN client 112.

In operation, as discussed, the VPN client 112 and the user application 114 may be downloaded dynamically on to the user device 102. The VPN client 112 can then associate the VPN agent 116 with the user application 114. For this, the VPN client 112 executes the user application 114 and associates the VPN agent 116 with the user application 114 such that the VPN agent 116 can intercept a request to an operating system service for establishing a connection, such as socket calls, generated by the user application 114. Socket calls may include calls related to socket creation, obtaining destination socket address, and the like. In one implementation, the socket calls may be calls that interact with application program interfaces (API), such as the WinSock API that is available in the Windows Operating System, provided by Microsoft Corporation.

Further, the VPN agent 116 can establish a communication channel with the VPN client 112. This can be accomplished by changing the destination address in the request intercepted by the VPN agent to a loop-back-interface address. The loop-back interface is a virtual network interface that may be integrated with an operating system and used to route data back to a source entity without intentional processing or modification. The most commonly used IP address for a loopback is 127.0.0.1 for IPv4, although any address in the range 127.0.0.0 to 127.255.255.255 is mapped to it. A loopback interface may be used by network client on a computer to communicate with an application on the same computer. The loop-back interface 208 can be configured to forward packets to either the VPN client 112 or the user application 114.

In addition, the VPN client 112 establishes a logical tunnel or VPN tunnel with the VPN gateway 110 and receives tunnel IP addresses. In one embodiment, the tunnel IP addresses correspond to IP addresses of a proxy at the VPN gateway 110 and of the enterprise application 108.

In operation, when the user application 114 is to send packets to the enterprise application 108, the packets are redirected to the VPN client 112 via the loop-back interface 208. The VPN client then suitably encrypts and sends the packets via the VPN tunnel to the VPN gateway 110. Similarly, packets received by the VPN client 112 from the VPN gateway 110 are sent to the user application 114 via the loop-back interface 208.

Figure 3:
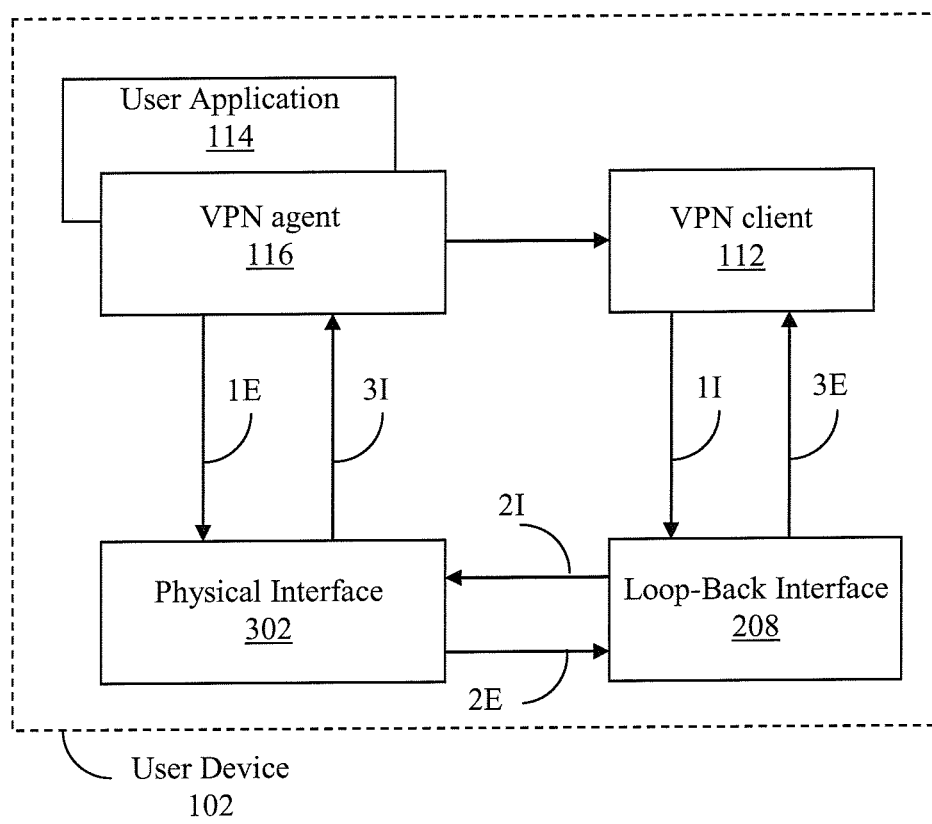
FIG. 3 illustrates working of an example VPN client application.

FIG. 3 illustrates an exemplary VPN client 112 in the user device 102 in accordance with one embodiment of the invention. The user device 102 is assigned an IP address, which is the IP address of a physical interface 302 in the network interfaces 206. The physical interface 302 may be a network adapter, such as a network card, that interfaces the user device 102 with any network. The physical interface 302 can be either a wired or a wireless network adapter supported by the operating system of the user device 102 through a variety of modules such as device drivers.

As discussed, upon successful authentication, the user is provided access to a number of pre-configured user applications, which can be located at diverse locations. In one embodiment, the pre-configured remote applications can be located on a USB device. The user can select a desired application, such as the user application 114, from amongst the list of pre-configured user applications.

The selected user application 114 is then downloaded on the user device 102 along with the VPN client 112 and is executed by the VPN client 112. In case the VPN client 112 is already executing on the user device 102, for example because of a different user application having been selected earlier, the VPN client 112 may not be re-downloaded. The VPN client 112 also initiates a VPN agent 116 that is associated with the user application 114. The initiation of the VPN agent may include the associating of a Hook Dynamic-link Library (DLL) file to the user application 114.

On execution, the user application 114 can invoke system calls to establish a communication path through the physical interface 302. In one implementation, in the case of Windows operating system, the executing user application 114 invokes WinSock API calls. These system or API calls are generated by the user application 114 for creation of sockets at the physical interface 302 and for acquiring a destination internet protocol (IP) address to establish the communication path. The VPN client 112 hooks the API calls generated by the user application 114 to associate the VPN agent 116 with the remote application 114.

Hooking is a programming technique that functions as an event handler by intercepting library functions calls or API calls made by an application. Generally, a hook system includes two parts: a hook server and a hook driver such as Winsock.dll. The hook server injects the hook driver into the address space of the application for intercepting the API calls. Also, the hook server controls and communicates with the hook driver. The hook driver performs the actual interception of the API calls, invoked by the application.

The VPN client 112, behaving as a hook server, performs hooking by creating a VPN agent 116 and associating the VPN agent 116 with the remote application 114. The VPN agent 116 includes API intercepting logic, or in other words a set of instructions for intercepting API calls generated by the remote application 114. The VPN agent 116 can monitor socket API calls issued by the remote application 114 and can communicate socket events to the VPN client 112. Thus, each time a new user application 114 is executed on the user device 102, the VPN client 112 creates a new VPN agent 116 and associates the new VPN agent 116 with the new remote application 114. Accordingly, the WinSock API calls, generated by the new remote application 114, are intercepted by the new VPN agent 116 and communicated to the VPN client 112.

In addition, as discussed, the VPN agent 116 establishes a communication channel with the VPN client 112 via the loop-back interface 208, and the VPN client 112 establishes a VPN network connection, such as an SSL tunnel, with the VPN gateway 110. A loop-back interface is a virtual interface that enables the user application 114 to send or receive data packets from the VPN client 112 through an IP address of the virtual interface, rather than through the IP address of the physical interface 302. The SSL tunnel is established by receiving IP addresses of the tunnel from the VPN gateway. The SSL tunnel may be established only once by the VPN client 112, when the first user application 114 is executed. Subsequently, each time a new user application 114 is executed, an additional SSL session may be established for the new user application 114 in the previously created SSL tunnel.

The loop-back interface 208 can be configured to forward packets to the VPN client 112 during egress flow, for sending packets from the user application 114 to the enterprise application 108. With reference to FIG. 3, the path followed by the packets during egress flow is depicted by 1E, 2E and 3E.

In one implementation, the VPN agent 116 changes the destination address of the packets generated by the user application 114 to the IP address of the loop-back interface 208, while the source address of the packets remains that of the physical interface 302. As a result, the packets are routed to the loop-back interface 208 from the physical interface 302. The loop-back interface 208 can be configured to send the packets received from the physical interface 302 to the VPN client 112. The VPN client 112 listens at a socket corresponding to the loop-back interface 208 to receive the packets.

At the VPN client 112, the source IP address of the packets is modified to a proxy source IP address provided by the VPN gateway 110. The modified source IP address of the packets behaves as an IP address of one end of the SSL tunnel. Also, the destination IP address of the packets is modified to a virtual destination IP address provided by the VPN gateway 110. The modified destination IP address of the packets corresponds to the IP address of the enterprise application 108 in the enterprise network 104, and behaves as an IP address of the other end of the SSL tunnel.

The packets with modified source and destination IP addresses, hereinafter referred to as modified packets, are then encapsulated and encrypted using the SSL protocol by the VPN client 112 for transmission to the enterprise application 108 through the SSL tunnel. The encapsulated SSL packets are provided with the IP address of the physical interface 302 as the source IP address and the physical IP address of the VPN gateway 110 as the destination IP address for transmission. Thus, the packets are transmitted to the VPN gateway 110 from the physical interface 302. After receiving the packets from the user device 102, the VPN gateway 110 can unwrap the packets and forward the packets to the enterprise application 108.

Similarly, during ingress flow, packets can be received by the user application 114 from the enterprise application 108 through the VPN client 112 and loop-back interface 208. With reference to FIG. 3, the path followed by the packets during ingress flow is depicted by 1I, 2I and 3I.

In an implementation, during ingress flow, the loop-back interface 208 receives the packets from the VPN client 112 and routes the packets to the user application 114. The user application 114, while waiting for a connection request from the enterprise application 108, invokes a listening event for which, the user application 114 invokes API calls, such as WinSock API calls, to communicate the state of the user application 114 to the enterprise application 108. The API calls are intercepted by the VPN agent 116, which communicates the socket listening information to the VPN client 112. The VPN client 112 initiates connection requests to the user application through the loop-back interface 208 when it receives connection requests from enterprise applications 108 through the tunnel.

In return, the enterprise application 108 sends response packets to the VPN gateway 110. The VPN gateway 110 encrypts the response packets and adds a header to the response packets for sending the response packets through the SSL tunnel. The header added by the VPN gateway 110 contains the tunnel IP address of the user device 102 as the destination address. The VPN client 112 receives these response packets.

On receiving the response packets, the VPN client 112 unwraps the response packets and forwards the unwrapped response packets (URPs) to the user application 114 through the loop-back interface 208. For this, the loop-back interface 208 can be configured to forward packets received from the VPN client 112 to a socket address on the physical interface 302 that corresponds to the user application 114. The physical interface 302 sends the packets to the user application 114 as depicted by ingress flow 3I.

As discussed, during both egress flow and ingress flow of data packets, the VPN agent 116 communicates socket listening information regarding the loop-back interface 208 and the physical interface 302 to the VPN client 112 dynamically. Thus the VPN client 112 does not have to be pre-configured to listen at a few static ports. As a result, the system can support applications that use dynamic ports, such as VoIP, Video Conferencing, and the like.

Figure 4:
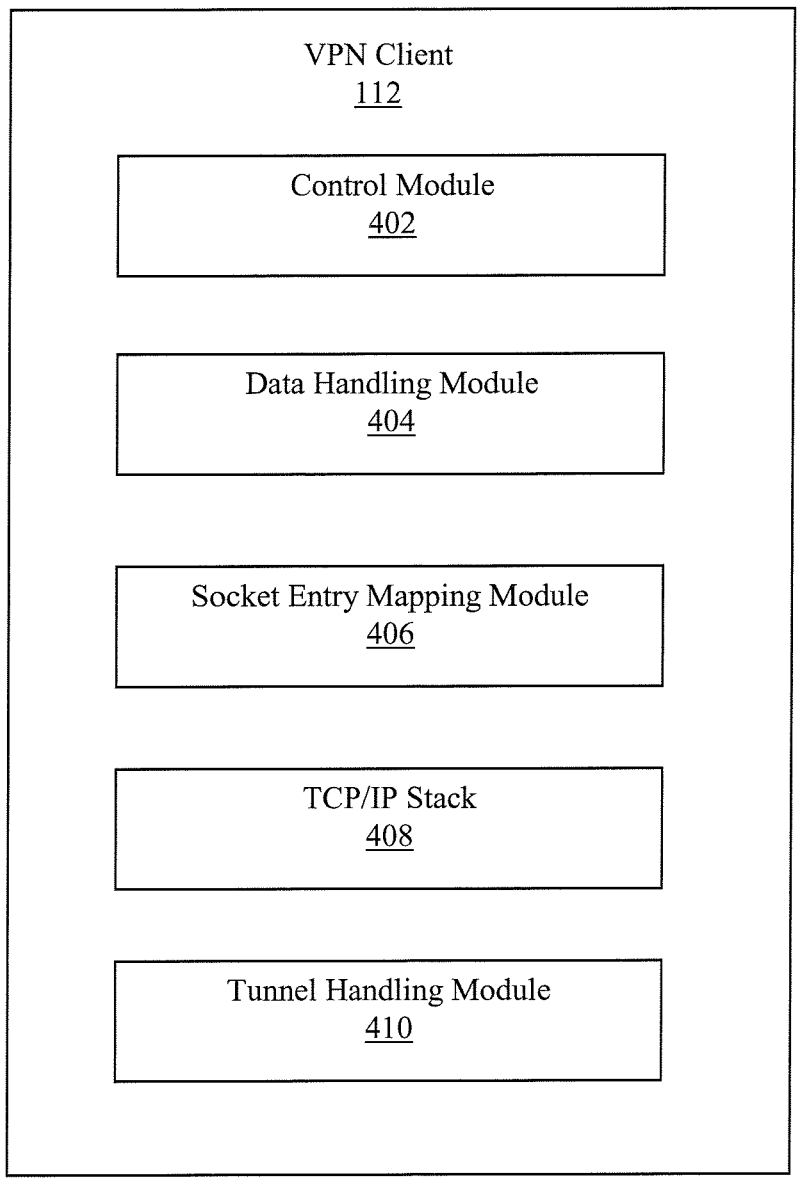
FIG. 4 illustrates modules of the VPN client application of FIG. 3.

FIG. 4 illustrates modules in an example VPN client 112. In one embodiment, the VPN client 112 includes a control module 402, a data handling module 404, a socket entry mapping module 406, a Transmission Control Protocol/Internet Protocol stack (TCP/IP) 408, and a tunnel handling module 410.

Upon successful authentication of a user, links to pre-configured user applications are displayed to the user. The user may select multiple user applications from the links displayed on the user device 102. For the first user application, such as the user application 114, selected by the user, the user application is downloaded to the user device 102 along with the VPN client 112. Thereafter, the user applications alone are downloaded individually in response to selection by the user.

The VPN client 112 executes the downloaded user applications using the control module 402. The control module 402 can associate a separate VPN agent 116 with every remote application 114 selected by the user. As discussed, the VPN agent 116 intercepts the WinSock API calls invoked by the associated remote application 114 at the time of execution. The control module 402 can also establish a communication channel between every VPN agent 116 and the VPN client 112. The communication channel may be established for communicating socket events such as socket creation, deletion and modification. Each VPN agent 116 in turn creates a loop-back interface 208 for re-directing packets from the associated user application 114 to the VPN client 112. Further, the control module 402 may establish a tunnel between the user device 102 and the VPN gateway 110 for secure transmission of data. Data in the form of data packets is transferred between the user application 114 in the user device 102 and the VPN gateway 110 through the loop-back interface 208 and the VPN client 112.

The VPN client 112 uses the data handling module 404 to receive and/or send the data packets from or to the loop-back interface 208. The data handling module 404 may use a mapping between real sockets, such as the sockets created with the operating system, and tunnel sockets, such as the sockets created in the VPN tunnel, for transmission of the data packets.

The socket entry mapping module 406 may contain the entries having information regarding the real sockets and the tunnel sockets such as IP addresses of the sockets. These entries allow the data handling module 404 to identify the appropriate loop-back interface through which the data packets have to be routed.

The TCP/IP stack 408 handles protocol related with various functions such as header preparation and modification, and timing for sending and/or receiving data packets. Further, the TCP/IP stack 408 provides an interface for the data handling module 404.

The encapsulation, unwrapping, and transfer and receipt of encapsulated data packets are handled through the tunnel handling module 410. For example, the tunnel handling module 410 may encrypt and encapsulate the data packets with their SSL headers so that they may be forwarded to the VPN gateway 110. The tunnel handling module 410 may also unwrap the data packets and forward it to the data handling module 404 for transmission to the user application 114.

Thus, the control module 402, the data handling module 404, the socket mapping entry 406, the TCP/IP stack 408, and the tunnel handling module 410 work together to redirect data packets through the tunnel.

Figure 5:
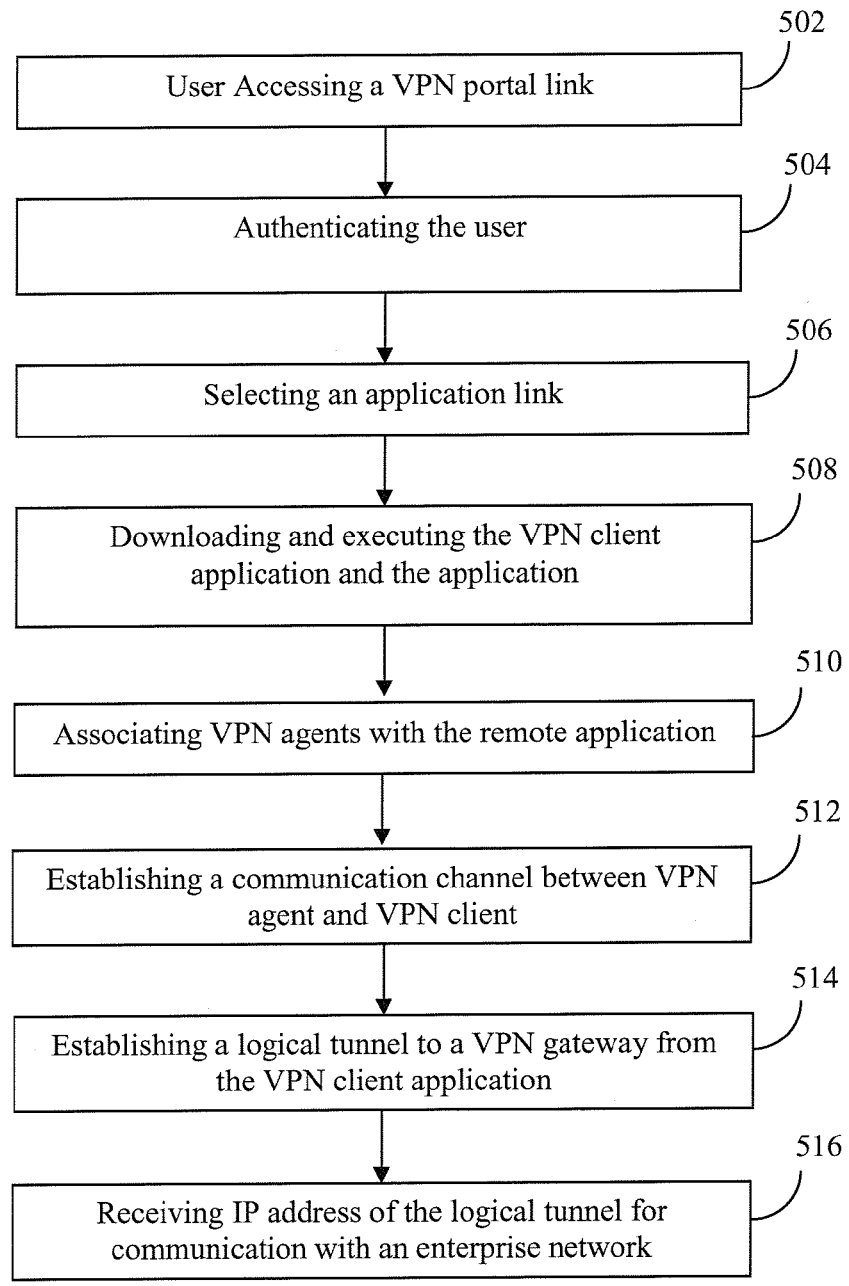
FIG. 5 illustrates an exemplary method for implementing a VPN client application.
Figure 6:
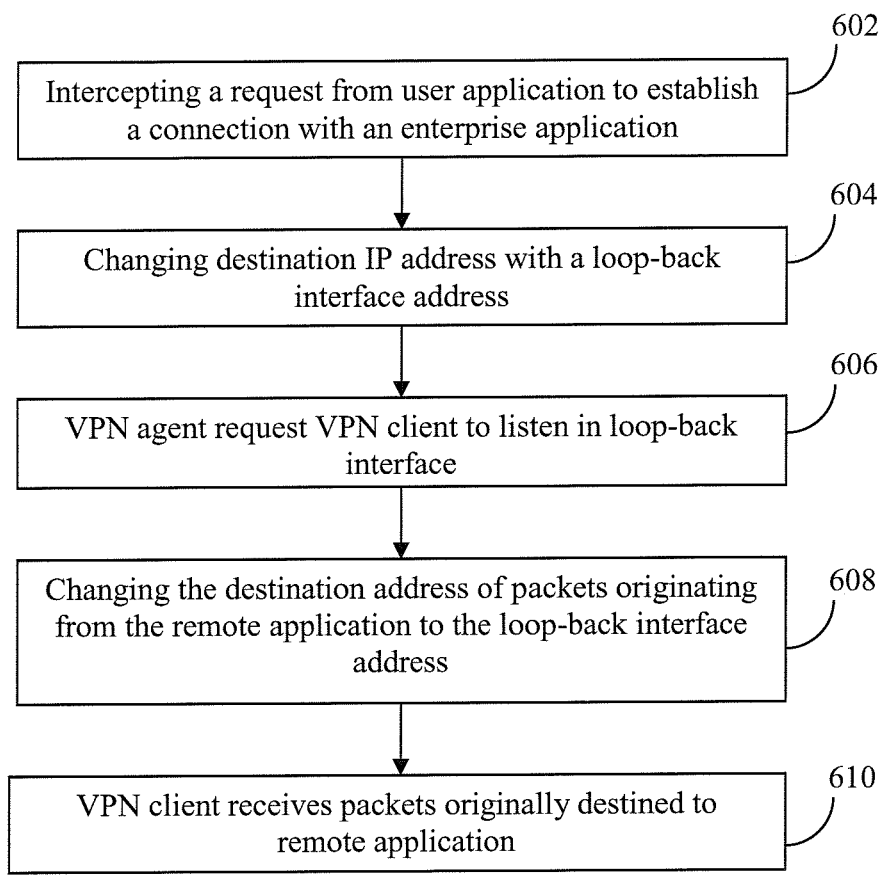
FIG. 6 represents a method for communicating packets from a user application to the VPN client application.

FIG. 5 is a flow chart illustrating an exemplary method 500 for implementing a VPN client 112, while FIG. 6 is a flow chart depicting a method 600 for communicating packets from a user application 114 to the VPN client 112. These exemplary methods may be described in the general context of computer executable instructions. Generally, computer executable instructions can include routines, programs, objects, components, data structures, procedures, modules, functions, and the like, that perform particular functions or implement particular abstract data types. The computer executable instructions can be stored on a computer readable medium and can be loaded or embedded in an appropriate device for execution.

Method 500 is initiated at block 502, where a VPN portal link, such as a web portal of an enterprise network that can be accessed through a web browser, is accessed by a user. In another example, the VPN client 112 can be accessed from a web portal of an enterprise network 104 through a web browser.

At block 504, the user is authenticated on the VPN gateway 110. For providing a secure and restricted access to an enterprise application 108, the user can be authenticated on the VPN gateway 110 by using a variety of techniques. For example, the user can be authenticated on the VPN gateway 110 with the help of a dedicated username and password. The authentication of the user also facilitates the VPN gateway 110 to identify the enterprise applications which the user is authorized to access.

At block 506, the user selects a user application link for the user application 114 that is desired to be executed. Upon successful authentication of the user on the VPN gateway 110, the desired user application 114 can be selected from multiple of user applications for which the user has authorized access.

At block 508, the VPN client 112 and the user application 114 selected via the link are downloaded and executed. The selected user application 114 is executed by the VPN client 112 for performing the requisite function. In an alternate implementation of steps 504 to 508, the VPN client 112, as well as the user application 114, may be located in an intermediate device. For example, they can be located in a universal serial bus (USB) device. Additionally, such a device may include additional indicia for the authentication of the uses in step 504.

At block 510, a VPN agent 116 is attached with the user application 114. For example, the VPN client 112 can initiate the hooking of socket API calls generated by the user application 114 to associate the VPN agent 116 with it. The VPN agent 116 is a module that includes an API intercepting logic. In other words, the VPN agent 116 is adapted to intercept API calls such as WinSock API calls in a Windows platform.

At block 512, a communication channel is established between the user application 114 and the VPN client 112. In an implementation, the VPN agent 116, attached with the user applications 114, facilitates establishing a communication channel between the user applications 114 and the VPN client 112 through the loop-back interface 208 by using a variety of techniques. For example, the VPN agent 116 can employ the functionality of creating sockets, through Winsock API calls, provided with the Windows operating system for setting up the communication channel.

At block 514, a logical tunnel is established between the VPN client 112 and a VPN gateway 110. The VPN client 112 establishes the logical tunnel to the VPN gateway 110 to provide a communication channel between the VPN client 112 and an enterprise application 108 in the enterprise network 104 by using a variety of known techniques.

At block 516, IP addresses of the tunnel are received for communication with the enterprise application 108. In order to facilitate communication between the user device 102 and the enterprise network 104, IP addresses of the tunnel are received by the VPN client 112 from the VPN gateway 110.

The order in which the method 500 is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

FIG. 6 illustrates a method 600 of communicating packets from the user application 114 to the VPN client 112, where the user application 114 requests establishment of a connection with an enterprise application 108.

At block 602, the VPN agent 116 associated with the user application 114 intercepts a request from the user application 114 to establish a connection with an enterprise application 108. Typically, in order to send or receive packets, the user application 114 needs to connect with the physical adapter or interface 302. The user application 114 needs to create a socket in the physical interface 302 prior to sending the packets. The user application 114 generally interacts with the physical interface 302 by raising a socket call. For example, in the Windows platform environment, the user application 114 generates Winsock API calls to request the physical interface 302 to create the socket for transmitting data traffic. Further, the call includes a request to the physical interface 302 to ascertain the IP address of the destination to which packets are to be sent. This request to obtain the destination address, originating from the user application 114, is intercepted by the VPN agent 116 at block 602 of method 600.

At block 604, in response to the request for destination address, the VPN agent 116 creates a loop-back interface 208. This can be accomplished by changing the destination IP address in the request to establish a connection to a loop-back interface address. The loop-back interface 208 can then serve as an intermediate module that may temporarily hold packets and redirect them to a predetermined location or application within the user device 102. In block 606, the VPN agent sends a request to the VPN client to listen in for packets addressed to the loop-back interface 208.

In block 608, the packets originating from the user application 114 are assigned the address of the loop-back interface 208 as the destination address. Thus the packets are now re-directed to the loop-back interface 208.

In block 610, the VPN client receives packets originally destined to the enterprise application 108 and, upon arrival of the packets at the loop-back interface 208, the packets are forwarded to the VPN client 112.

Figure 7:
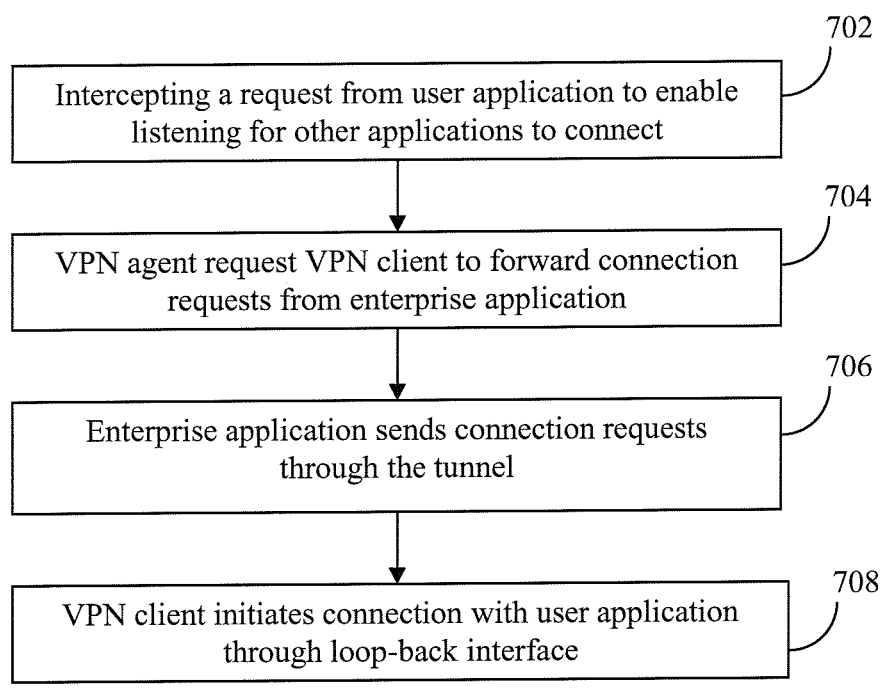
FIG. 7 represents a method for communicating packets from a VPN client to the user application.

FIG. 7 illustrates a method 700 of communicating packets from the VPN client 112 to the user application 114, where the enterprise application 118 requests establishment of a connection with the user application 114.

At block 702, the VPN agent 116 associated with the user application 114 intercepts a request from the user application 114 to enable listening for other applications to connect. This request may include a Winsock API call to the physical interface 302.

At block 704, the VPN agent requests the VPN client to forward requests that it receives from the enterprise application 108 to the user application 114 via the loop-back interface 208.

At block 706, the enterprise application 108 sends a connection request through a tunnel established between the VPN client 112 and the VPN Gateway 110.

At block 708, the VPN client 112 initiates a connection with the user application 114 through the loop-back interface 208.

The order in which the methods 600 and 700 are described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

What is claimed is:

1. A method, in a user device, for establishing a connection between a user application on the user device and an enterprise application on an enterprise network, the method comprising the steps of:
intercepting, by a virtual private network (VPN) agent instantiated on the user device and individually associated with the user application on the user device, a request to an operating system service of the user device for establishing the connection, the request originating from the user application on the user device; and
establishing, based on the intercepted request, a communication channel within the user device, the communication channel being configured to only handle traffic associated with the user application and extending between the VPN agent associated with the user application and a VPN client configured to implement a VPN tunnel to securely transmit traffic from the user device to the enterprise network, both the VPN agent and VPN client residing on the user device.

2. The method of claim 1, wherein the request comprises a socket application program interface (API) call.

3. The method of claim 1, wherein the step of establishing a communication channel between the VPN client and the VPN agent comprises creating a loop-back interface between the VPN client and the VPN agent.

4. The method of claim 3, wherein the creation of the loop-back interface comprises changing a destination address in the request to a loop-back interface address.

5. The method of claim 4, further comprising the step of requesting, by the VPN agent to the VPN client, to listen in the loop-back interface.

6. The method of claim 1, wherein the VPN agent is associated with the user application by the VPN client and is not associated with any other user application running on the user device.

7. The method of claim 1, wherein the step of intercepting by the VPN agent comprises hooking an application program interface (API) call from the user application requesting creation of a socket for the user application.

8. The method of claim 4, further comprising the steps of:
changing a destination address of a data packet from the user application to the loop-back interface address; and
forwarding the data packet from the VPN agent to the VPN client.

9. The method of claim 8, further comprising the step of mapping, by the VPN client, the loop-back interface address to an address associated with a VPN tunnel.

10. The method of claim 9, further comprising the step of using a Transport Control Protocol/ Internet Protocol (TCP/IP) stack to prepare the data packet for transmission by a tunnel in accordance with the mapping.

11. A method in a user device for establishing a connection between an enterprise application on an enterprise network and a user application on a user device through a virtual private network (VPN) client on the user device, the method comprising the steps of:
intercepting, by a VPN agent instantiated on the user device and individually associated with the user application on the user device, a request to an operating system service of the user device to enable listening for requests by other applications to connect with the user application on the user device, the request originating from the user application;
requesting, by the VPN agent to the VPN client to forward connection requests from the enterprise application;
receiving, by the VPN client, a connection request from the enterprise application through a VPN tunnel; and
establishing, based on the received connection request, a communication channel within the user device between the VPN client and the VPN agent, the communication channel being configured to only handle traffic associated with the user application and extending between the VPN agent associated with the user application and the VPN client associated with the VPN tunnel, both the VPN agent and VPN client residing on the user device.

12. The method of claim 11, wherein the request to an operating system service comprises a socket application program interface (API) call.

13. The method of claim 11, wherein the step of establishing a communication channel between the VPN client and the VPN agent comprises creating a loop-back interface between the VPN client application and the VPN agent.

14. The method of claim 11, wherein the VPN agent is associated with the user application by the VPN client and is not associated with any other user application running on the user device.

15. The method of claim 11, wherein the step of intercepting by the VPN agent comprises hooking an application program interface (API) call for creation of a socket.

16. A system for remote virtual private network (VPN) access to an enterprise application, comprising:
an enterprise network including an enterprise application; and
a user device, wherein the user device includes a VPN agent individually associated with a user application on the user device and adapted to intercept a request to an operating system service of the user device for establishing a connection from the user application executing on the user device to the enterprise application and to establish, based on the intercepted request, a communication channel within the user device, the communication channel being configured to only handle traffic associated with the user application and extending between the VPN agent associated with the user application and a VPN client configured to implement a VPN tunnel to securely transmit traffic from the user device to the enterprise network, both the VPN agent and VPN client residing on the user device.

17. The system of claim 16, wherein the request comprises a socket application program interface (API) call.

18. The system of claim 16, wherein the VPN agent is further adapted to create a loopback interface between the VPN client application and the VPN agent.

19. The system of claim 18, wherein the VPN agent is further adapted to request the VPN client to listen in the loop-back interface.

20. The system of claim 16, wherein the VPN agent is associated with the user application by the VPN client and is not associated with any other user application running on the user device.

21. The method of claim 1, wherein the request comprises a socket application program interface (API) call; and
wherein the step of establishing a communication channel between the VPN client and the VPN agent comprises creating a loop-back interface between the VPN client and the VPN agent, the loop-back interface being implemented as a virtual interface that enables the user application to send or receive data packets from the VPN client through an IP address of the virtual interface, rather than through an IP address of a physical interface.

* * * * *